United States Patent
Yang et al.

(10) Patent No.: US 9,332,466 B2
(45) Date of Patent: May 3, 2016

(54) UPLINK TIMING ADVANCE ADJUSTMENT

(71) Applicant: QUALCOMM Incorporated, San Diego, CA (US)

(72) Inventors: Ming Yang, San Diego, CA (US); Tom Chin, San Diego, CA (US); Guangming Shi, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 15 days.

(21) Appl. No.: 14/221,145

(22) Filed: Mar. 20, 2014

(65) Prior Publication Data

US 2015/0271723 A1    Sep. 24, 2015

(51) Int. Cl.
| | |
|---|---|
| H04W 36/00 | (2009.01) |
| H04W 36/08 | (2009.01) |
| H04W 36/38 | (2009.01) |
| H04W 56/00 | (2009.01) |
| H04W 36/14 | (2009.01) |
| H04W 88/06 | (2009.01) |

(52) U.S. Cl.
CPC .......... *H04W 36/08* (2013.01); *H04W 36/0077* (2013.01); *H04W 36/38* (2013.01); *H04W 56/0005* (2013.01); *H04W 56/0045* (2013.01); *H04W 36/14* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 8,260,297 B2* | 9/2012 | Jeong et al. | 455/436 |
| 8,942,702 B2* | 1/2015 | Chin et al. | 455/436 |
| 2007/0149206 A1* | 6/2007 | Wang et al. | 455/450 |
| 2008/0084849 A1 | 4/2008 | Wang et al. | |
| 2010/0290427 A1* | 11/2010 | Sebire et al. | 370/331 |
| 2012/0040674 A1 | 2/2012 | McGilly et al. | |
| 2012/0163248 A1 | 6/2012 | Chin et al. | |
| 2012/0177006 A1 | 7/2012 | Tsai et al. | |
| 2013/0176997 A1* | 7/2013 | Tian et al. | 370/336 |
| 2013/0250925 A1 | 9/2013 | Loehr et al. | |
| 2014/0064247 A1* | 3/2014 | Teyeb et al. | 370/331 |

FOREIGN PATENT DOCUMENTS

| | | |
|---|---|---|
| EP | 2418785 A1 | 2/2012 |
| GB | 2493183 A | 1/2013 |
| WO | 2009002248 A1 | 12/2008 |
| WO | 2012087358 A1 | 6/2012 |

OTHER PUBLICATIONS

International Search Report and Written Opinion—PCT/US2015/021692—ISA/EPO—Jun. 11, 2015.

* cited by examiner

*Primary Examiner* — Diane Mizrahi
(74) *Attorney, Agent, or Firm* — Seyfarth Shaw LLP

(57) ABSTRACT

A user equipment (UE) determines an uplink timing advance of a target NodeB, such as an uplink dedicated physical channel (DPCH) transmit timing, during handover transition when the UE receives a handover command without a random access configuration. In one instance, the UE modifies a current timing advance of a source eNodeB based on a difference between an uplink timing of the source eNodeB and a downlink timing of the source eNodeB and a difference between an uplink timing of the target NodeB and a downlink timing of the target NodeB. In another instance, the UE determines the uplink timing advance of the target NodeB based on the modified current uplink timing advance of the source eNodeB.

12 Claims, 11 Drawing Sheets

UPLINK TIMING ADVANCE ADJUSTMENT

TECHNICAL FIELD

Aspects of the present disclosure relate generally to wireless communication systems, and more particularly, to an improved inter-radio access technology (IRAT) baton handover procedure.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the universal terrestrial radio access network (UTRAN). The UTRAN is the radio access network (RAN) defined as a part of the universal mobile telecommunications system (UMTS), a third generation (3G) mobile phone technology supported by the 3rd Generation Partnership Project (3GPP). The UMTS, which is the successor to global system for mobile communications (GSM) technologies, currently supports various air interface standards, such as wideband-code division multiple access (W-CDMA), time division-code division multiple access (TD-CDMA), and time division-synchronous code division multiple access (TD-SCDMA). For example, China is pursuing TD-SCDMA as the underlying air interface in the UTRAN architecture with its existing GSM infrastructure as the core network. The UMTS also supports enhanced 3G data communications protocols, such as high speed packet access (HSPA), which provides higher data transfer speeds and capacity to associated UMTS networks. HSPA is a collection of two mobile telephony protocols, high speed downlink packet access (HSDPA) and high speed uplink packet access (HSUPA) that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

According to one aspect of the present disclosure, a method for wireless communication includes receiving an inter-radio access technology (IRAT) handover command to handover a user equipment from a source cell to a target cell. The handover command does not include a random access configuration. The method also includes modifying a current uplink timing advance of the source cell based on: a difference between an uplink timing of the source cell and a downlink timing of the source cell, and a difference between an uplink timing of the target cell and a downlink timing of the target cell. The method further includes determining an uplink timing advance of the target cell based on the modified current uplink timing advance of the source cell.

Another aspect discloses, an apparatus for wireless communication includes means for receiving an inter-radio access technology (IRAT) handover command to handover a user equipment from a source cell to a target cell. The handover command does not include a random access configuration. The apparatus also includes means for modifying a current uplink timing advance of the source cell based on: a difference between an uplink timing of the source cell and a downlink timing of the source cell, and a difference between an uplink timing of the target cell and a downlink timing of the target cell. The apparatus further includes means for determining an uplink timing advance of the target cell based at least in part on the modified current uplink timing advance of the source cell.

Another aspect discloses an apparatus for wireless communication having a memory and at least one processor coupled to the memory. The processor(s) is configured to receive an inter-radio access technology (IRAT) handover command to handover a user equipment from a source cell to a target cell. The handover command does not include a random access configuration. The processor(s) is also configured to modify a current uplink timing advance of the source cell based on: a difference between an uplink timing of the source cell and a downlink timing of the source cell, and a difference between an uplink timing of the target cell and a downlink timing of the target cell. The processor(s) is further configured to determine an uplink timing advance of the target cell based on the modified current uplink timing advance of the source cell.

Another aspect discloses a computer program product for wireless communication in a wireless network includes a computer readable medium having non-transitory program code recorded thereon. The program code includes program code to receive an inter-radio access technology (IRAT) handover command to handover a user equipment from a source cell to a target cell. The handover command does not include a random access configuration. The program code also includes program code to modify a current uplink timing advance of the source cell based on: a difference between an uplink timing of the source cell and a downlink timing of the source cell, and a difference between an uplink timing of the target cell and a downlink timing of the target cell. The program code also includes program code to determine an uplink timing advance of the target cell based on the modified current uplink timing advance of the source cell.

In another aspect of the present disclosure, method for wireless communication is disclosed and includes receiving an inter-radio access technology (IRAT) handover command to handover a user equipment from a source cell to a target cell. The handover command does not include a random access configuration. The method also includes modifying a current uplink timing advance of the source cell based on a difference between a frame boundary of the source cell and a frame boundary of the target cell. The method further includes determining an uplink timing advance of the target cell based at least in part on the modified current uplink timing advance of the source cell.

Another aspect discloses an apparatus for wireless communication includes means for receiving an inter-radio access technology (IRAT) handover command to handover a user equipment from a source cell to a target cell. The handover command does not include a random access configuration. The apparatus also includes means for modifying a current uplink timing advance of the source cell based on a difference between a frame boundary of the source cell and a frame boundary of the target cell. The method further includes means for determining an uplink timing advance of the target cell based on the modified current uplink timing advance of the source cell.

Another aspect discloses an apparatus for wireless communication includes a memory and at least one processor coupled to the memory. The processor(s) is configured to receive an inter-radio access technology (IRAT) handover command to handover a user equipment from a source cell to a target cell. The handover command does not include a random access configuration. The processor(s) is also configured to modify a current uplink timing advance of the source cell based on a difference between a frame boundary of the source cell and a frame boundary of the target cell. The processor(s) is further configured to determine an uplink timing advance of the target cell based at least in part on the modified current uplink timing advance of the source cell.

Another aspect discloses a computer program product for wireless communication in a wireless network includes a computer readable medium having non-transitory program code recorded thereon. The program code includes program code to receive an inter-radio access technology (IRAT) handover command to handover a user equipment from a source cell to a target cell. The handover command does not include a random access configuration. The program code also includes program code to modify a current uplink timing advance of the source cell based on a difference between a frame boundary of the source cell and a frame boundary of the target cell. The program code further includes program code to determine an uplink timing advance of the target cell based on the modified current uplink timing advance of the source cell.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
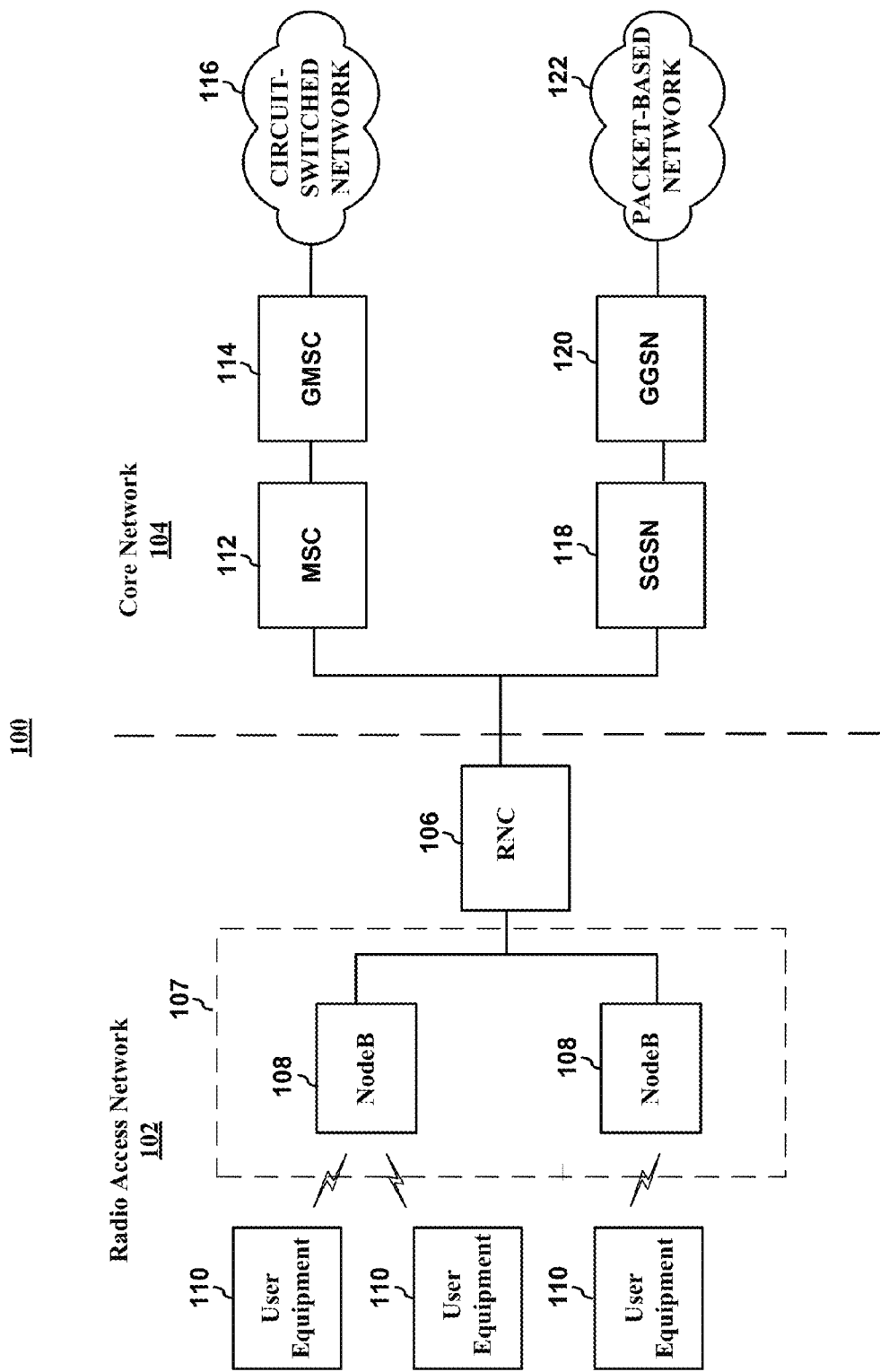
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of radio network subsystems (RNSs) such as an RNS 107, each controlled by a radio network controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a nodeB in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two nodeBs 108 are shown; however, the RNS 107 may include any number of wireless nodeBs. The nodeBs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the nodeBs 108. The downlink (DL), also called the forward link, refers to the communication link from a nodeB to a UE, and the uplink (UL), also called the reverse link, refers to the communication link from a UE to a nodeB.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 supports packet-data services with a serving general packet radio service (GPRS) support node (SGSN) 118 and a gateway GPRS support node (GGSN) 120. GPRS is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a nodeB 108 and a UE 110, but divides UL and DL transmissions into different time slots in the carrier.

Figure 2:
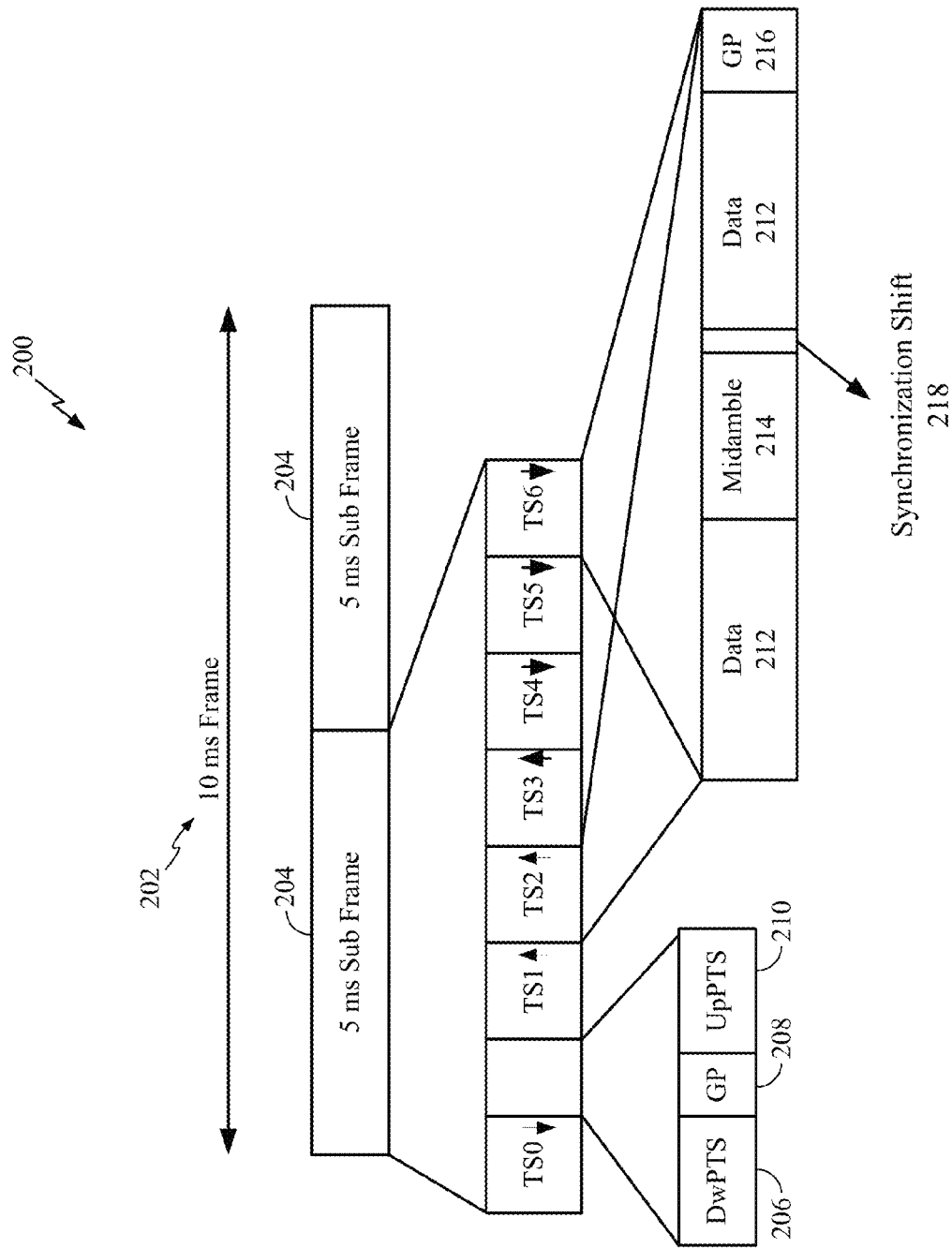
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including synchronization shift (SS) bits 218. Synchronization shift bits 218 only appear in the second part of the data portion. The synchronization shift bits 218 immediately following the midamble can indicate three cases: decrease shift, increase shift, or do nothing in the upload transmit timing. The positions of the synchronization shift bits 218 are not generally used during uplink communications.

Figure 3:
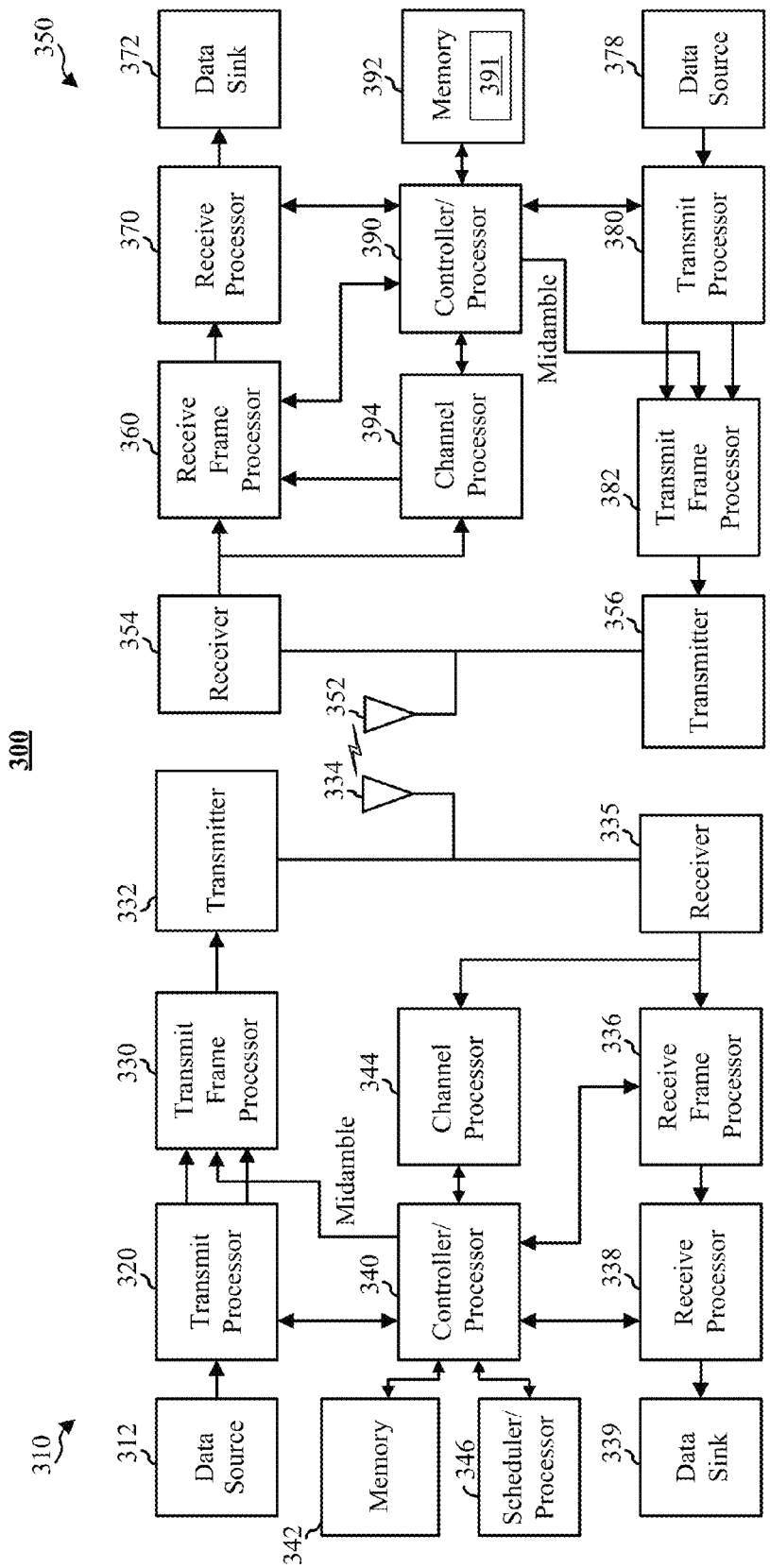
FIG. 3 is a block diagram conceptually illustrating an example of a nodeB in communication with a user equipment (UE) in a telecommunications system.

FIG. 3 is a block diagram of a nodeB or eNodeB 310 in communication with a UE 350 in a RAN 300, where the RAN 300 may be the RAN 102 in FIG. 1, the nodeB 310 may be the nodeB 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the nodeB 310. More specifically, the receive processor 370 descrambles and despreads the symbols, and then determines the most likely signal constellation points transmitted by the nodeB 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receive processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the nodeB 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the nodeB 310 or from feedback contained in the midamble transmitted by the nodeB 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the nodeB 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the nodeB 310 and the UE 350, respectively. For example, the controller/processors 340 and 390 may provide various functions including timing, peripheral interfaces, voltage regulation, power management, and other control functions. The computer-readable media of memories 342 and 392 may store data and software for the nodeB 310 and the UE 350, respectively. For example, the memory 392 of the UE 350 may store a handover module 391 which, when executed by the controller/processor 390, configures the UE 350 to perform an improved inter-radio access technology baton handover procedure based on aspects of the present disclosure. A scheduler/processor 346 at the nodeB 310 may be used to allocate resources to the UEs and schedule downlink and/or uplink transmissions for the UEs.

High speed uplink packet access (HSUPA) or time division high speed uplink packet access (TD-HSUPA) is a set of enhancements to time division synchronous code division multiple access (TD-SCDMA) in order to improve uplink throughput. In TD-HSUPA, the following physical channels are relevant.

The enhanced uplink dedicated channel (E-DCH) is a dedicated transport channel that features enhancements to an existing dedicated transport channel carrying data traffic.

The enhanced data channel (E-DCH) or enhanced physical uplink channel (E-PUCH) carries E-DCH traffic and schedule information (SI). Information in this E-PUCH channel can be transmitted in a burst fashion.

The E-DCH uplink control channel (E-UCCH) carries layer 1 (or physical layer) information for E-DCH transmissions. The transport block size may be 6 bits and the retransmission sequence number (RSN) may be 2 bits. Also, the hybrid automatic repeat request (HARQ) process ID may be 2 bits.

The E-DCH random access uplink control channel (E-RUCCH) is an uplink physical control channel that carries SI and enhanced radio network temporary identities (E-RNTI) for identifying UEs.

The absolute grant channel for E-DCH (enhanced access grant channel (E-AGCH)) carries grants for E-PUCH transmission, such as the maximum allowable E-PUCH transmission power, time slots, and code channels.

The hybrid automatic repeat request (hybrid ARQ or HARQ) indication channel for E-DCH (E-HICH) carries HARQ ACK/NACK signals.

The operation of TD-HSUPA may also have the following steps. First, in the resource request step, the UE sends requests (e.g., via scheduling information (SI)) via the E-PUCH or the E-RUCCH to a base station (e.g., NodeB). The requests are for permission to transmit on the uplink channels. Next, in a resource allocation step, the base station, which controls the uplink radio resources, allocates resources. Resources are allocated in terms of scheduling grants (SGs) to individual UEs based on their requests. In the third step (i.e., the UE Transmission step), the UE transmits on the uplink channels after receiving grants from the base station. The UE determines the transmission rate and the corresponding transport format combination (TFC) based on the received grants. The UE may also request additional grants if it has more data to transmit. Finally, in the fourth step (i.e., the base station reception step), a hybrid automatic repeat request (hybrid ARQ or HARQ) process is employed for the rapid retransmission of erroneously received data packets between the UE and the base station.

The transmission of scheduling information (SI) may consist of two types in TD-HSUPA: (1) In-band and (2) Out-band. For in-band, which may be included in MAC-e PDU (medium access control e-type protocol data unit) on the E-PUCH, data can be sent standalone or may piggyback on a data packet. For Out-band, data may be sent on the E-RUCCH in case that the UE does not have a grant. Otherwise, the grant expires.

The scheduling information (SI) may include the following information or fields: the highest priority logical channel ID (HLID) field, the total E-DCH buffer status (TEBS) field, the highest priority logical channel buffer status (HLBS) field and the UE power headroom (UPH) field.

The highest priority logical channel ID (HLID) field unambiguously identifies the highest priority logical channel with available data. If multiple logical channels exist with the highest priority, the one corresponding to the highest buffer occupancy will be reported.

The total E-DCH buffer status (TEBS) field identifies the total amount of data available across all logical channels for which reporting has been requested by the radio resource control (RRC) and indicates the amount of data in number of bytes that is available for transmission and retransmission in the radio link control (RLC) layer. When the medium access control (MAC) is connected to an acknowledged mode (AM) RLC entity, control protocol data units (PDUs) to be transmitted and RLC PDUs outside the RLC transmission window are also be included in the TEBS. RLC PDUs that have been transmitted but not negatively acknowledged by the peer entity shall not be included in the TEBS. The actual value of TEBS transmitted is one of 31 values that are mapped to a range of number of bytes (e.g., 5 mapping to TEBS, where 24<TEBS<32).

The highest priority logical channel buffer status (HLBS) field indicates the amount of data available from the logical channel identified by HLID, relative to the highest value of the buffer size reported by TEBS. In one configuration, this report is made when the reported TEBS index is not 31, and relative to 50,000 bytes when the reported TEBS index is 31. The values taken by HLBS are one of a set of 16 values that map to a range of percentage values (e.g., 2 maps to 6%<HLBS<8%).

The UE power headroom (UPH) field indicates the ratio of the maximum UE transmission power and the corresponding dedicated physical control channel (DPCCH) code power.

The serving neighbor path loss (SNPL) reports the path loss ratio between the serving cells and the neighboring cells. The base station scheduler incorporates the SNPL for inter-cell interference management tasks to avoid neighbor cell overload.

Figure 4:
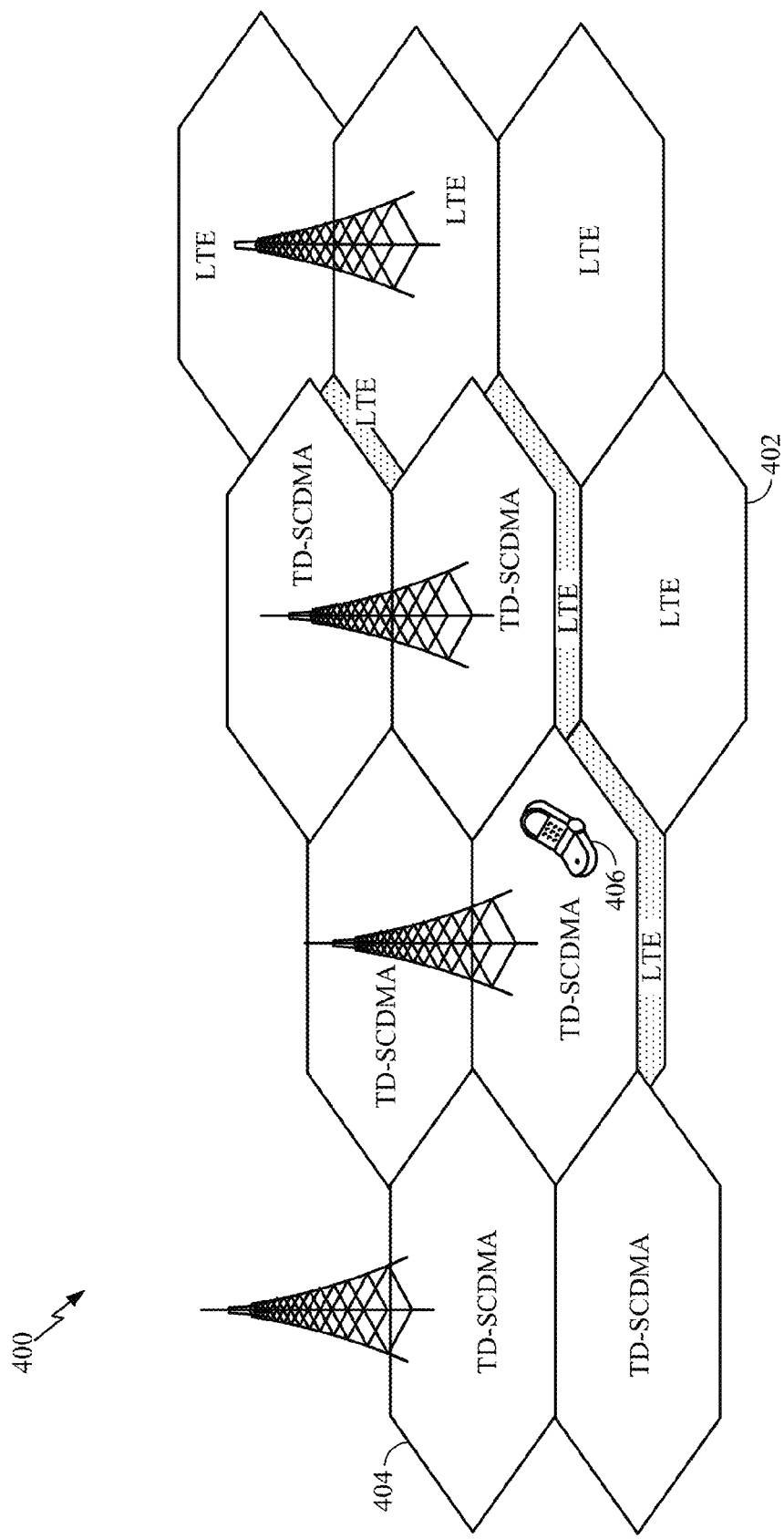
FIG. 4 illustrates network coverage areas according to aspects of the present disclosure.

FIG. 4 illustrates coverage of a newly deployed network, such as an LTE network and also coverage of a more established network, such as a TD-SCDMA network. A geographical area 400 may include LTE cells 402 and TD-SCDMA cells 404. A user equipment (UE) 406 may move from one cell, such as a TD-SCDMA cell 404, to another cell, such as an LTE cell 402. The movement of the UE 406 may specify a handover or a cell reselection.

The handover or cell reselection may be performed when the UE moves from a coverage area of a TD-SCDMA cell to the coverage area of an LTE cell, or vice versa. A handover or cell reselection may also be performed when there is a coverage hole or lack of coverage in the TD-SCDMA network or when there is traffic balancing between the TD-SCDMA and LTE networks. As part of that handover or cell reselection process, while in a connected mode with a first system (e.g., TD-SCDMA) a UE may be specified to perform a measurement of a neighboring cell (such as LTE cell). For example, the UE may measure the neighbor cells of a second network for signal strength, frequency channel, and base station ID. The UE may then connect to the strongest cell of the second network. Such measurement may be referred to as inter-radio access technology (IRAT) measurement.

The UE may send a serving/source cell a measurement report indicating results of the IRAT measurement performed by the UE. The serving cell may then trigger a handover of the UE to a new cell in the other RAT based on the measurement report. The triggering may be based on a comparison between measurements of the different RATs. The measurement may include a TD-SCDMA serving cell signal strength, such as a received signal code power (RSCP) for a pilot channel (e.g., primary common control physical channel (P-CCPCH)). The signal strength is compared to a serving system threshold. The serving system threshold can be indicated to the UE through dedicated radio resource control (RRC) signaling from the network. The measurement may also include a neighbor cell received signal strength indicator (RSSI). The neighbor cell signal strength can be compared with a neighbor system threshold.

Other radio access technologies, such as a wireless local area network (WLAN) or Wi-Fi may also be accessed by a user equipment (UE) in addition to cellular networks such as TD-SCDMA or GSM. For the UE to determine nearby Wi-Fi access points (APs), the UE scans available Wi-Fi channels to identify/detect if any Wi-Fi networks exist in the vicinity of the UE. In one configuration, the UE may use TD-SCDMA reception/transmission gaps to switch to the Wi-Fi network to scan the Wi-Fi channels.

Certain mobile user equipment (UE) may be configured to allow for operation on multiple wireless communication networks. For example, a UE may be capable of operating either on a first network (e.g., a TD-SCDMA network) or on a second network (e.g., a long term evolution LTE network). Certain situations may direct the UE to communicate on one particular available network. For example, a multi-mode UE capable of communicating on either the TD-SCDMA network or the LTE network may wish to connect to the LTE network for data service and to the TD-SCDMA network for voice service.

Figure 5:
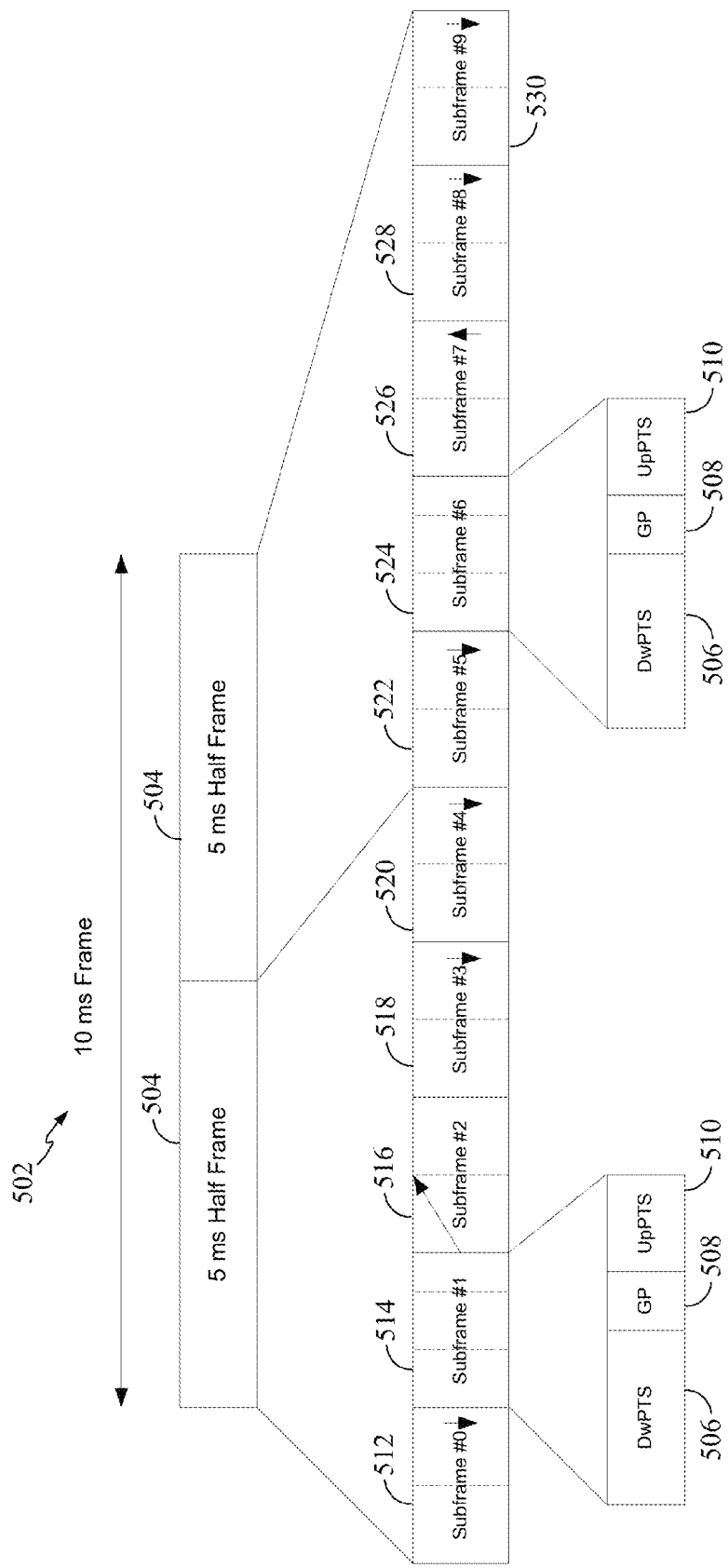
FIG. 5 is a block diagram conceptually illustrating an example of a frame structure in a Long Term Evolution telecommunications system.

FIG. 5 shows a frame structure for an LTE carrier. The LTE carrier, as illustrated, has a frame 502 that is 10 ms in length. Each radio frame has 307200 Ts, where T is the basic time unit of LTE. Each frame has two 5 ms half frames 504, and each of the half frames 504 includes five time subframes, giving each individual frame ten subframes, shown as subframes #0 through #9 (512-530). Each subframe can be either a downlink subframe (D), uplink subframe (U), or special subframe (S). Downlink subframes and uplink subframes can be divided into two slots, each of 0.5 ms. A special subframe may be divided into a downlink pilot timeslot (DwPTS), an uplink pilot timeslot (UpPTS), and a gap period. Depending on the configuration, the duration of the DwPTS, the UpPTS, and the gap period can vary.

As illustrated in FIG. 5, subframe #1 514 and subframe #6 524 are special subframes each with a DwPTS 506, a gap period (GP) 508, and a UpPTS 510. Subframes #0, 3, 4, 5, 8, and 9 (512, 518, 520, 522, 528, and 530) are downlink subframes and subframes #2 and 7 (516 and 526) are uplink subframes. This uplink-downlink configuration corresponds to LTE frame configuration 2.

Uplink Timing Advance Adjustment

Aspects of the disclosure are directed to increasing a handover success rate when performing handover from one radio access technology (RAT) to another RAT. The handover may be an inter-radio access technology (IRAT) handover from a first RAT (e.g., long term evolution (LTE) network) to a second RAT (e.g., a time division synchronous code division multiple access (TD-SCDMA)). IRAT handover is used when a user equipment (UE) is in connected mode to enable packet switched data connection transition from a source RAT to a target RAT. Some aspects of the present disclosure allows a UE to determine a target cell (e.g., TD-SCDMA) uplink timing advance based on a source cell (e.g., LTE) uplink timing advance when the UE receives a handover command without a random access configuration. For example, the handover command may not include an uplink synchronization parameter, such as an uplink timing advance. In this case, the UE derives the uplink timing advance of a target NodeB, such as an uplink dedicated physical channel (DPCH) transmit timing, during handover transition.

The UE may determine the uplink timing advance of the target NodeB based on a modification of a current uplink timing advance of a source eNodeB. In one aspect of the disclosure, the UE modifies the current timing advance of the source eNodeB based on a difference between an uplink timing of the source eNodeB and a downlink timing of the source eNodeB and a difference between an uplink timing of the target NodeB and a downlink timing of the target NodeB. In other aspects, the UE modifies the current timing advance of the source eNodeB based on a difference between a frame boundary of the source eNodeB and a frame boundary of the target NodeB.

Although LTE to TD-SCDMA handover is described, other types of IRAT handover are also contemplated, for example, LTE to LTE handover, LTE to GSM handover, and TD-SCDMA to TD-SCDMA handover. In some aspects, the handover may be based on a time division duplexed-Long Term Evolution (TDD-LTE).

In TDD LTE, a same communication spectrum is used for both uplink transmissions from the UEs to an eNodeB and for downlink transmissions from the eNodeB to the UEs. Switching between transmit and receive functions occurs from downlink to uplink (UE switching from reception to transmission) and from uplink to downlink (base station switching from reception to transmission). To preserve the orthogonality of the LTE uplink, propagation delays between an eNodeB and the UEs are compensated based on a timing advance implementation. For LTE systems, the timing-advanced uplink transmission should not overlap with reception of any preceding downlink.

Overlap between downlink and uplink communication may be prevented by specifying a transmission gap (e.g., a guard period) between the downlink and uplink communications. The guard period between reception (downlink) and transmission (uplink) may be specified to accommodate an increased or largest possible timing advance and any switching delay. The timing advance of the LTE system is a function of the round-trip propagation delay. In addition, the total guard time for an uplink-downlink cycle of the LTE system may be longer than the worst round-trip propagation delay supported by a cell.

Figure 6:
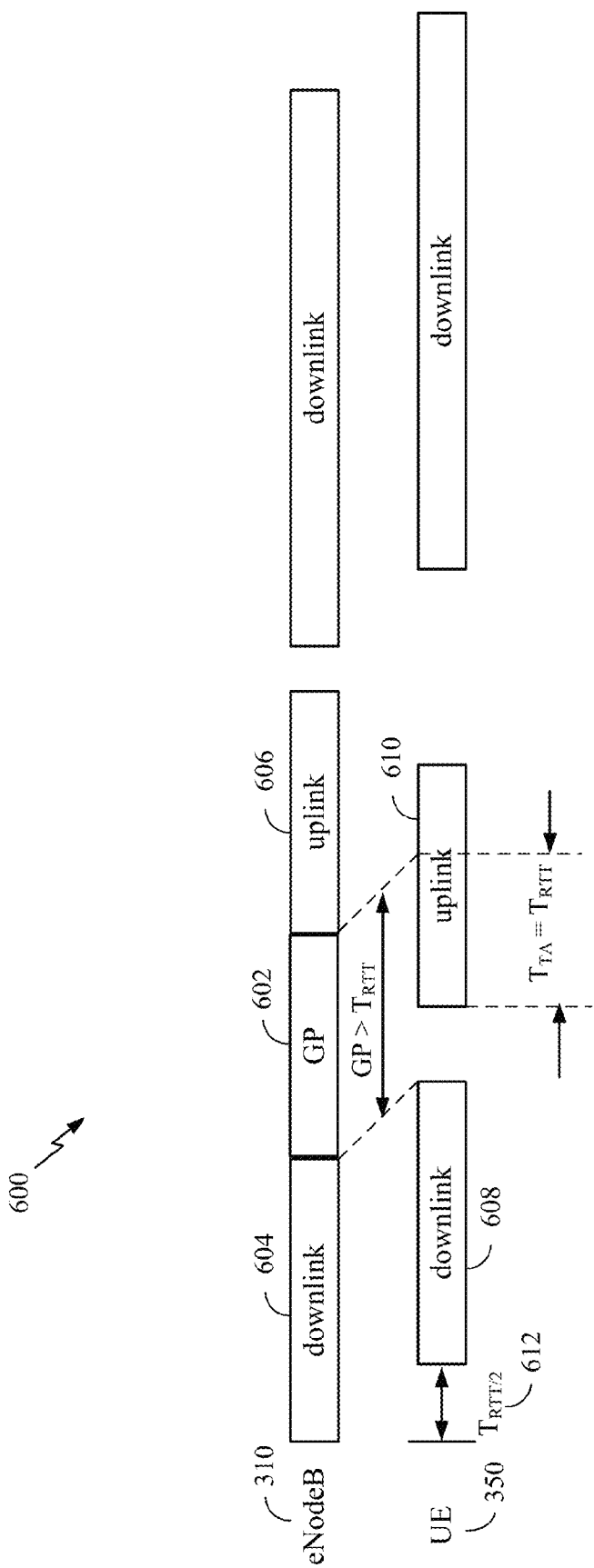
FIG. 6 is a timing diagram in which a guard period between a downlink communication and an uplink communication of an eNodeB is specified to prevent overlap between a downlink communication and an uplink communication of a UE.

FIG. 6 is a timing diagram 600 in which a guard period 602 between a downlink communication 604 and an uplink communication 606 of an eNodeB 310 is selected to prevent overlap between a downlink communication 608 and an uplink communication 610 of a UE 350. To prevent the overlap, the guard period 602 should exceed a round-trip propagation delay $T_{RTT}$ at the UE 350, where $T_{RTT/2}$ denotes a one-way propagation delay 612. The timing advance $T_{TA}$ of the LTE system is a function of the round-trip propagation delay $T_{RTT}$. In some instances, the timing advance $T_{TA}$ may be equal to the round-trip propagation delay $T_{RTT}$. The guard period (GP) may be computed according the following equation:

$$GP > T_{RTT}$$

Figure 7:
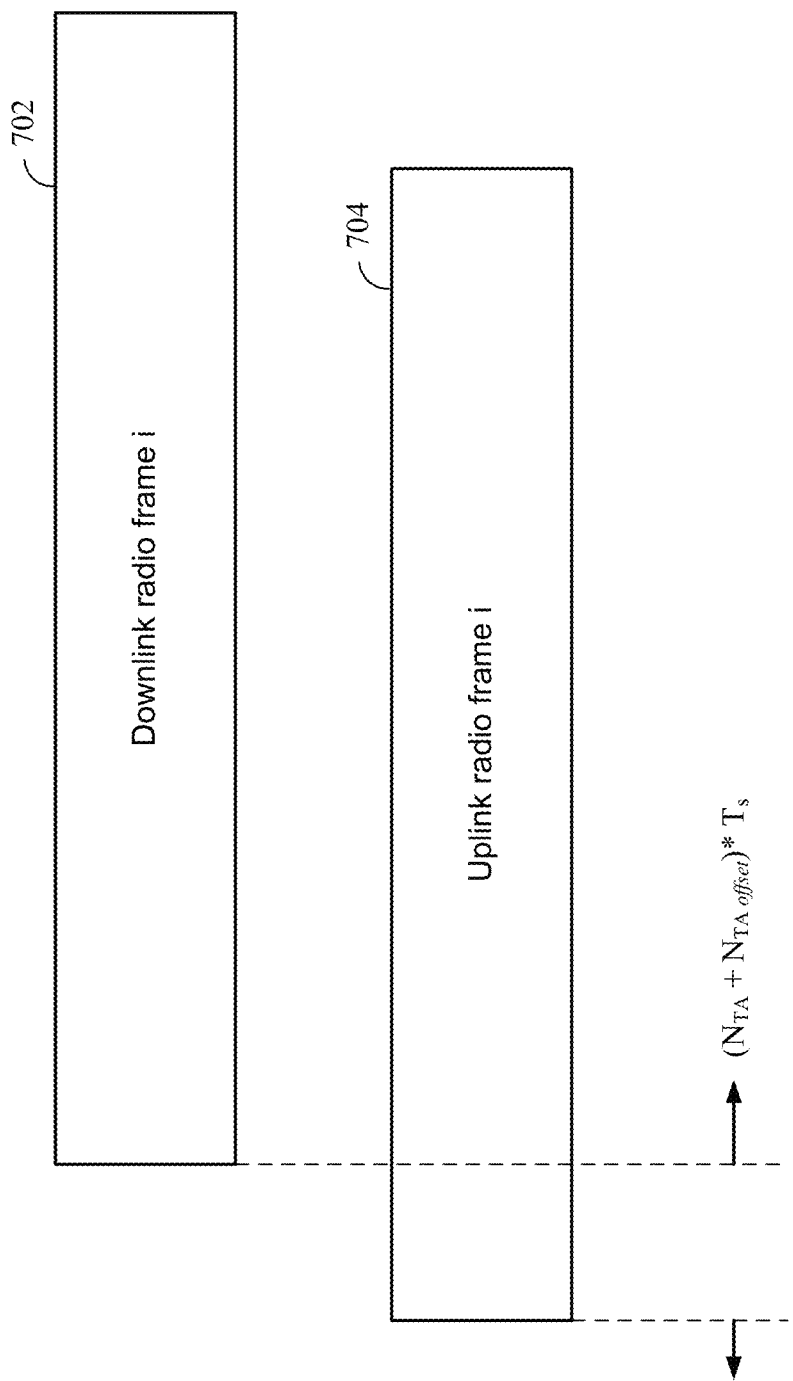
FIG. 7 illustrates exemplary downlink long term evolution (LTE) frame juxtaposed against an uplink LTE 704 on a same frequency and separated in a time domain.

FIG. 7 illustrates an exemplary downlink LTE frame 702 juxtaposed against an uplink LTE frame 704 on a same frequency and separated in a time domain. An LTE system may be configured for both frequency division duplex (FDD) and time division duplex (TDD) communications. A UE of an LTE system may adjust an uplink transmission timing based on a timing advance implementation. For example, in the FDD mode, different frequencies are used for downlink and uplink transmissions and a timing advance offset ($N_{TA\ offset}$) of the timing advance implementation is specified as zero.

In the TDD mode, the downlink and the uplink transmissions are on a same frequency and a separation between the downlink and the uplink transmissions occur in the time domain. In the TDD mode, each direction in a call is assigned to specific timeslots. The timing advance implementation prevents an overlap between a downlink and an uplink communication when switching from uplink to downlink transmissions in the TDD mode. The LTE uplink timing or timing advance may be based on a measured downlink timing. For example, the uplink timing advance may be given by a measured downlink timing advance plus a timing advance value.

The timing advance value may be based on a predetermined uplink timing advance value specified by the network and a timing advance offset value based on the LTE configuration. For example, the LTE timing advance may be given by a timing advance offset $N_{TA\ offset}$ and the timing advance value $N_{TA}$.

Radio access technologies (RATs), such as LTE and TD-SCDMA networks may be deployed to share physical base stations and/or frequency bands. In such deployments, the RATs may align their respective uplink and downlink communications to avoid interference with the other RAT's downlink/uplink communications. LTE radio frame parameters and TD-SCDMA relative timing may be adjusted to allow co-existence between the TD-SCDMA downlink/uplink communications and LTE uplink/downlink communications, thereby reducing interference between the two RATs.

Both LTE and TD-SCDMA have a special timeslot featuring a downlink pilot timeslot, a gap period, and an uplink pilot timeslot. In LTE, the special timeslot is configurable, thus allowing the alignment of switching points between LTE and TD-SCDMA. The relative timing of LTE to TD-SCDMA may be adjusted to allow co-existence of the two technologies and reduction of interference when the two RATs are deployed on the same or adjacent frequencies.

Figure 8:
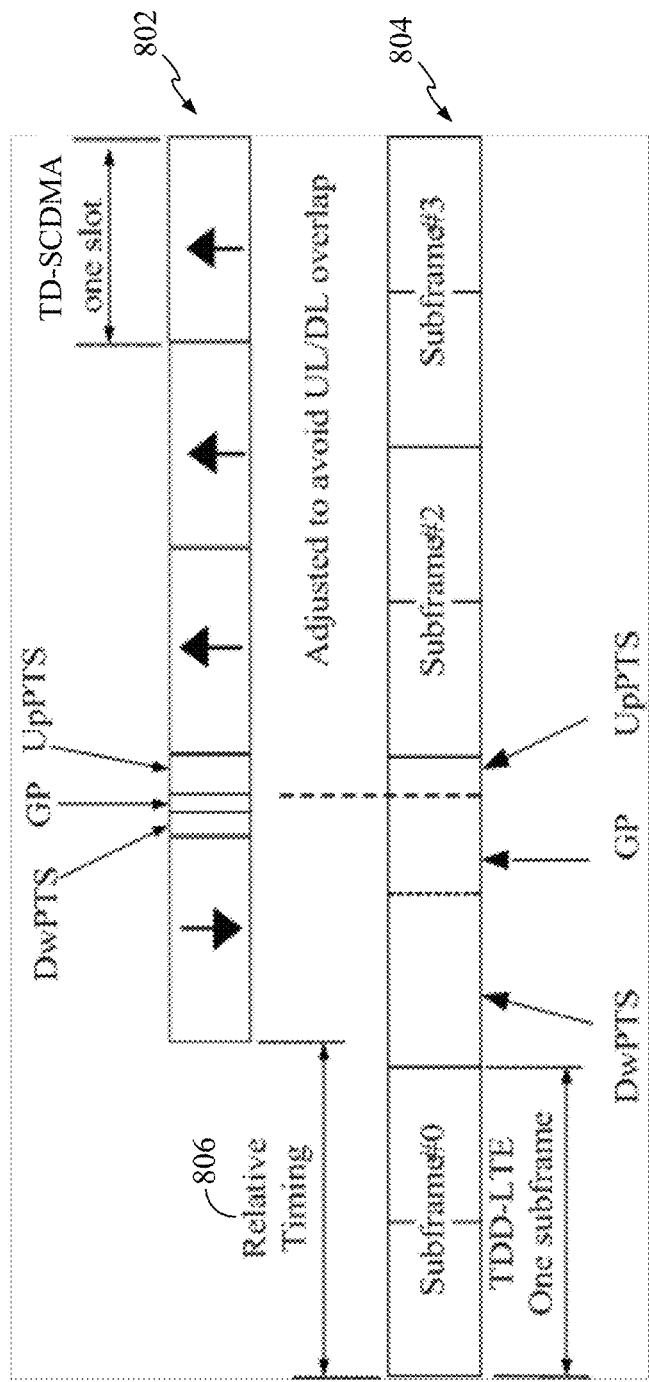
FIG. 8 is a block diagram conceptually illustrating a frame alignment between a time division synchronous code division multiple access (TD-SCDMA) frame and a long term evolution (LTE) frame.

FIG. 8 is a block diagram conceptually illustrating a frame alignment between a TD-SCDMA frame and an LTE frame. As shown in FIG. 8, the TD-SCDMA frame 802 may be aligned with the TDD-LTE frame 804 using a relative timing offset 806 between the beginnings of the two frames. This configuration reduces interference caused by overlap between downlink communications on one RAT and uplink communications on the other RAT.

Some systems (e.g., TD-SCDMA) specify that a NodeB receives signals from multiple UEs synchronously. Because the UEs are located various distances from the NodeB, a transmission clock of each UE is adjusted so that a UE far from the NodeB starts to transmit earlier, while a UE closer to the NodeB starts to transmit later. This process is referred to as uplink synchronization or timing alignment. In some instances, a source NodeB transmits a timing advance (TA) to each UE, and the UE decides the start time of an uplink subframe transmission according to the timing advance. The timing advance information helps a UE to complete handover from a source RAT to a target RAT.

In some communications specifications, handover is performed via random access based hard handover or baton handover. For example, LTE to TD-SCDMA handover is performed with random access information for a target TD-SCDMA cell indicated in a "handover to UTRAN command" message, such as a mobilityfromEUTRAcommand. In the case of hard handover, a user equipment may switch both downlink and uplink communications from a source cell (e.g., source eNodeB) to a target cell (e.g., target NodeB) simultaneously. In the case of baton handover, upon receiving the handover command from the source eNodeB, the UE may first switch uplink communications to the target NodeB, and then switch downlink communications to the target NodeB. These two steps of baton handover allow the target NodeB to acquire uplink communications, measure timing/power, and configure beamforming before the UE switches downlink communications to the target NodeB. As a result of the two step process, the baton handover may be less disruptive than the hard handover.

To accomplish synchronization in the case of hard handover, the UE may be specified to transmit an uplink synchronization (SYNC-UL) sequence, and to receive a random access response (FPACH message) before the normal communication (e.g., data transmission) starts. In the case of baton handover, the UE switches uplink communications first to allow the target NodeB to measure the uplink timing for subsequent adjustment in an end stage of the baton handover.

In some instances, when the handover command, such as a LTE to TD-SCDMA cell handover command, does not include a random access configuration (e.g., an uplink synchronization parameter), the UE performs baton handover. While baton handover can reduce latency relative to hard handover, successful handover is not guaranteed due to open loop power and timing control inaccuracy associated with the baton handover. For example, because of the open loop nature of timing and power control for baton handover, in certain circumstances the timing calculated/estimated by the UE is inaccurate. As a result of the inaccurate timing estimation (e.g., uplink timing advance), the uplink DPCH data or a special burst arrival timing may not fall within the target NodeB monitor window. As a result, the uplink DPCH data or a special burst may not be detected by the target NodeB. If the target NodeB does not detect the uplink DPCH data or a special burst, the target NodeB fails to start downlink transmission. As noted, without the uplink communications from the UE, the target NodeB fails to determine beamforming for downlink communications to the UE, and fails to configure downlink transmissions to the UE. This failure to configure the downlink transmissions may result in a handover failure.

Aspects of the present disclosure allows the UE to derive an uplink timing advance, such as an uplink dedicated physical channel (DPCH) transmit timing, during handover transition when the UE receives a handover command without random access configuration. The handover command may instruct the UE to hand over from the source eNodeB to a target NodeB.

In one aspect of the present disclosure, the UE measures the downlink timing of the source eNodeB and identifies the source eNodeB system frame number (SFN) and uplink timing advance. The uplink timing advance of the source eNodeB may be specified by the network. For example, when the UE connects to a source LTE cell, the source LTE cell sends timing adjustment information, including uplink timing advance information, to the UE in specified time periods (e.g., every 2 seconds). When the UE receives the handover command that does not include the random access configuration, the UE performs acquisition on the target NodeB and blindly decodes a primary common control physical channel (PC-CPCH) to read the target NodeB system frame number. The UE measures the downlink timing of the target NodeB.

In some aspects of the disclosure, the UE estimates an initial uplink timing advance of the target NodeB based on a modified current uplink timing advance of the source eNodeB. For example, the initial uplink timing advance of the target NodeB may be given by the current uplink timing advance of the source eNodeB plus the modifications to the current uplink timing advance of the source eNodeB.

In some aspects of the present disclosure, the current uplink timing advance of the source eNodeB may be modified based on a difference between timing advance values of the source eNodeB and target nodeB. For example, a first difference in timing advance values of the source eNodeB is based on a difference between an uplink timing of the source eNodeB and a downlink timing of the source eNodeB. A second difference in timing advance values of the target nodeB is based on a difference between an uplink timing of the target NodeB and a downlink timing of the target NodeB. The current uplink timing advance of the source eNodeB may be modified based on a difference between the first difference and the second difference.

In some aspects of the disclosure, the uplink timing of the source eNodeB and the downlink timing of the source eNodeB may be measured or specified by a network. Similarly, the uplink timing of the target NodeB and the downlink timing of the target NodeB may be measured or specified by the network. Alternatively, a source network determines the difference between the uplink timing of the source eNodeB and the downlink timing of the source eNodeB and a target network determines the difference between an uplink timing of the target NodeB and the downlink timing of the target NodeB.

In addition, the current uplink timing advance of the source eNodeB may be modified based on a difference between a frame boundary of the source eNodeB and a frame boundary of the target NodeB. The frame boundary difference of the source eNodeB is based on a source eNodeB system frame number (SFN) and a source eNodeB subframe number. The frame boundary difference of the target NodeB is based on a target NodeB system frame number and a target NodeB subframe number. Further, the current uplink timing advance of the source eNodeB may be modified based on a difference between the measured downlink timing of the source eNodeB and the measured downlink timing of the target NodeB.

In some aspects of the present disclosure, the initial uplink timing advance of the target NodeB during handover transition is calculated based on different wireless communication parameters. The parameters may include the current uplink timing advance of the source eNodeB, a downlink timing difference between the source eNodeB and the target NodeB, a system frame number difference between the source eNodeB and the target NodeB and/or the difference between the uplink timing of the source eNodeB and the downlink timing of the source eNodeB and the difference between the uplink timing of the target NodeB and the downlink timing of the target NodeB. In one aspect of the disclosure, the initial uplink timing advance of the target NodeB is the sum of the parameters.

Aspects of the present disclosure allow the UE to estimate an uplink timing advance of the target NodeB during handover transition when the received handover command does not include the random access configuration. This determination improves the chance that the uplink DPCH data or a special burst arrival timing falls within the target NodeB monitor window thereby increasing the handover success rate.

Figure 9:
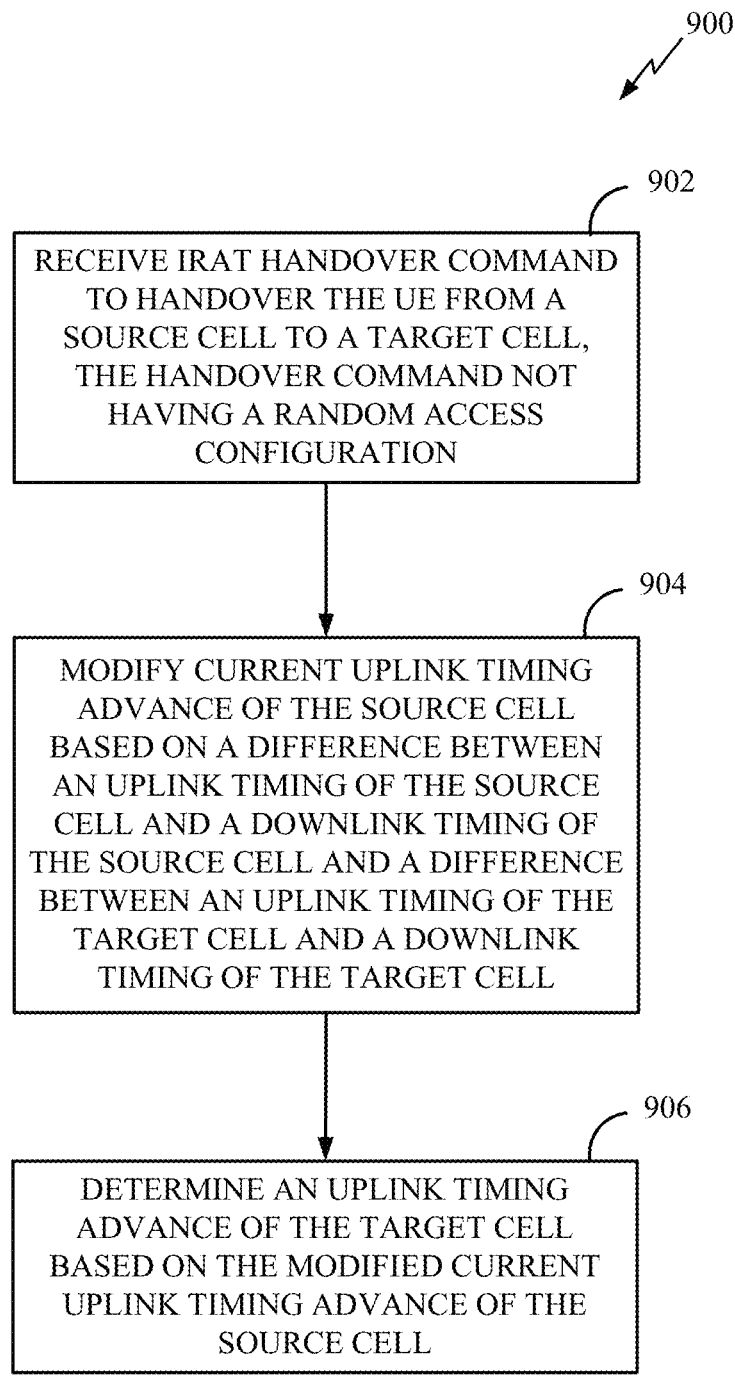
FIG. 9 is a flow diagram illustrating a wireless communication method for inter-radio access technology (IRAT) handover according to aspects of the present disclosure.

FIG. 9 is a flow diagram illustrating a wireless communication method 900 for inter-radio access technology (IRAT) handover according to aspects of the present disclosure. A UE receives an IRAT handover command to handover the UE from a source eNodeB to a target NodeB, as shown in block 902. The handover command does not include a random access configuration. The UE modifies a current uplink timing advance of the source eNodeB based on a difference between an uplink timing of the source eNodeB and a downlink timing of the source eNodeB and a difference between an uplink timing of the target NodeB and a downlink timing of the target NodeB, as shown in block 904. The UE determines an uplink timing advance of the target NodeB based on the modified current uplink timing advance of the source eNodeB, as shown in block 906.

Figure 10:
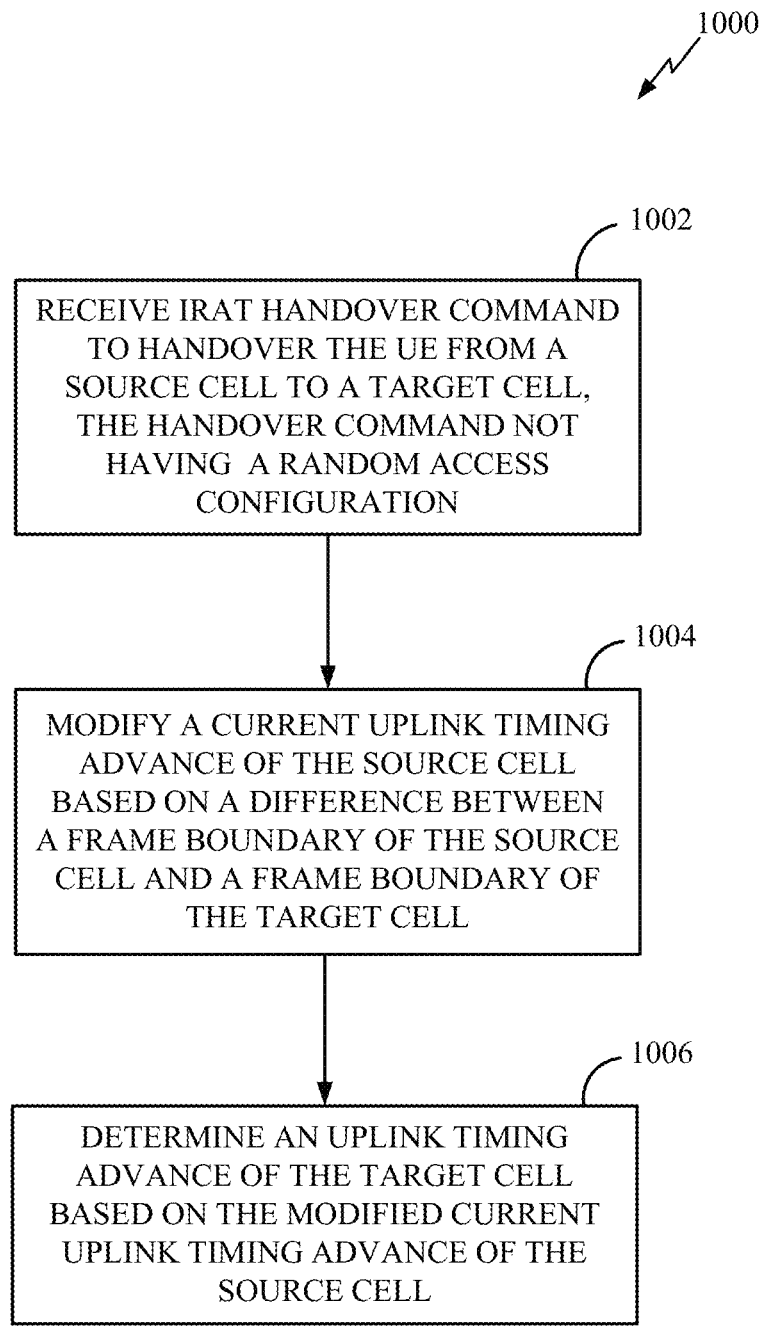
FIG. 10 is a flow diagram illustrating another wireless communication method for inter-radio access technology (IRAT) handover according to aspects of the present disclosure.

FIG. 10 is a flow diagram illustrating another wireless communication method 1000 for inter-radio access technology (IRAT) handover according to aspects of the present disclosure. A UE receives an IRAT handover command to handover the UE from a source eNodeB to a target NodeB, as shown in block 1002. The handover command does not include a random access configuration. The UE modifies a current uplink timing advance of the source eNodeB based on a difference between a frame boundary of the source eNodeB and a frame boundary of the target NodeB, as shown in block 1004. The UE determines an initial uplink timing advance of the target NodeB based on the modified current uplink timing advance of the source eNodeB, as shown in block 1006.

Figure 11:
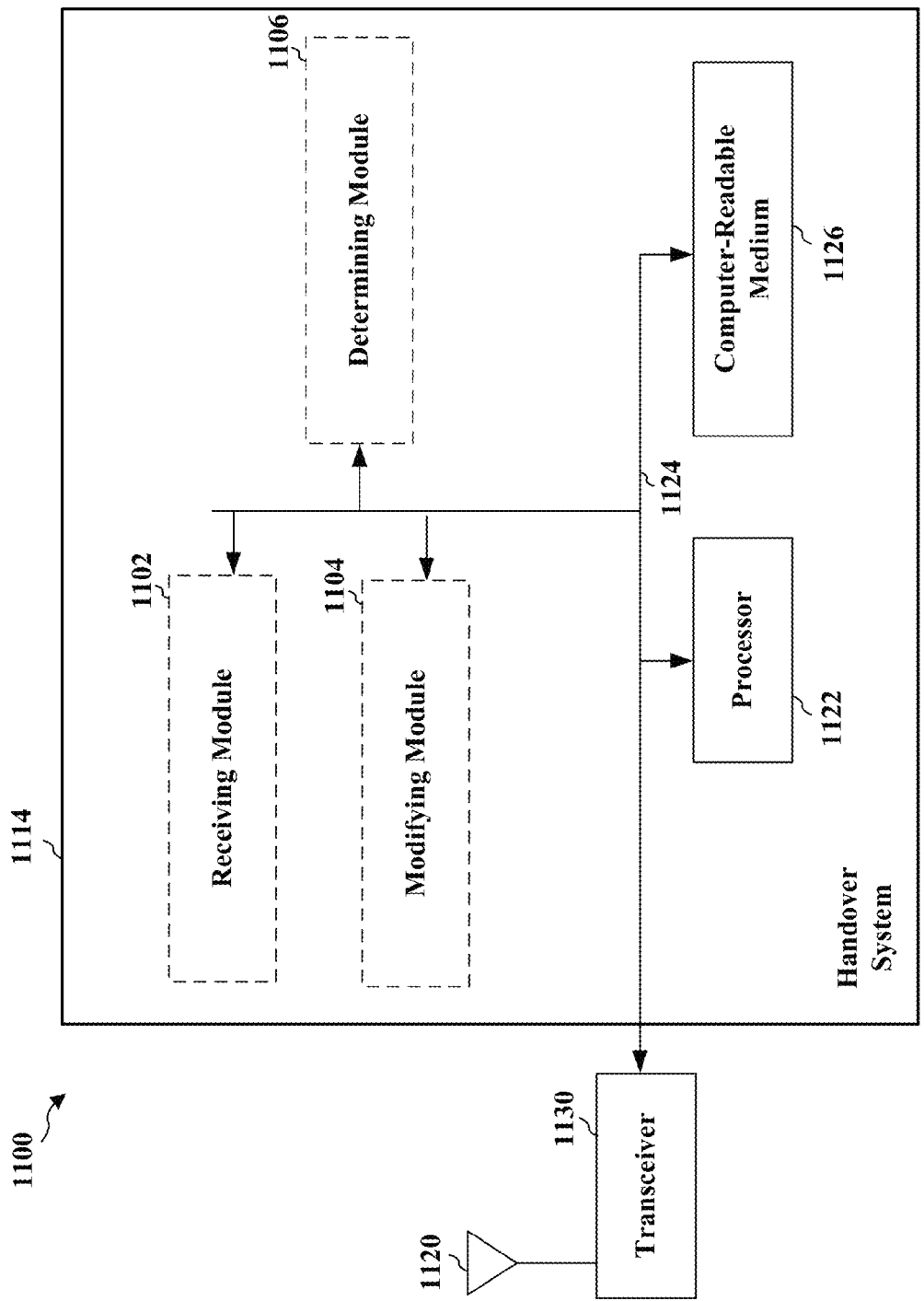
FIG. 11 is a block diagram illustrating an example of a hardware implementation for an apparatus employing a processing system.

FIG. 11 is a block diagram illustrating an example of a hardware implementation for an apparatus 1100 employing a handover system 1114. The handover system 1114 may be implemented with a bus architecture, represented generally by the bus 1124. The bus 1124 may include any number of interconnecting buses and bridges depending on the specific application of the handover system 1114 and the overall design constraints. The bus 1124 links together various circuits including one or more processors and/or hardware modules, represented by the processor 1122, the receiving module 1102, the modifying module 1104, the determining module 1106 and the computer-readable medium 1126. The bus 1124 may also link various other circuits such as timing sources, peripherals, voltage regulators, and power management circuits, which are well known in the art, and therefore, will not be described any further.

The apparatus includes a handover system 1114 coupled to a transceiver 1130. The transceiver 1130 is coupled to one or more antennas 1120. The transceiver 1130 enables communicating with various other apparatus over a transmission medium. The handover system 1114 includes a processor 1122 coupled to a computer-readable medium 1126. The processor 1122 is responsible for general processing, including the execution of software stored on the computer-readable medium 1126. The software, when executed by the processor 1122, causes the handover system 1114 to perform the various functions described for any particular apparatus. The computer-readable medium 1126 may also be used for storing data that is manipulated by the processor 1122 when executing software.

The handover system 1114 includes a receiving module 1102 for receiving an inter-radio access technology (IRAT) handover command to handover a user equipment from a source eNodeB to a target NodeB. The handover system 1114 also includes a modifying module 1104 for modifying a current uplink timing advance of the source eNodeB based on a difference between an uplink timing of the source eNodeB and a downlink timing of the source eNodeB and a difference between an uplink timing of the target NodeB and a downlink timing of the target NodeB. The modifying module 1104 also modifies the current uplink timing advance of the source eNodeB based on a difference between a frame boundary of the source eNodeB and a frame boundary of the target NodeB. The handover system 1114 also includes a determining module 1106 for determining an uplink timing advance of the target NodeB based on the modified current uplink timing advance of the source eNodeB. The modules may be software modules running in the processor 1122, resident/stored in the computer-readable medium 1126, one or more hardware modules coupled to the processor 1122, or some combination thereof. The handover system 1114 may be a component of the UE 350 and may include the memory 392, and/or the controller/processor 390.

In one configuration, an apparatus, such as an UE 350, is configured for wireless communication including means for receiving. In one aspect, the receiving means may be the antennas 352, 1120, the receiver 354, the transceiver 1130, the receive processor 370, the controller/processor 390, the memory 392, the handover module 391, the receiving module 1102, the processor 1122, and/or the handover system 1114 configured to perform the functions recited by the aforementioned means. In another aspect, the aforementioned means may be a module or any apparatus configured to perform the functions recited by the aforementioned means.

In one configuration, the apparatus configured for wireless communication also includes means for modifying. In one aspect, the modifying means may be the receive processor 370, the controller/processor 390, the memory 392, the handover module 391, the determining module 1106, the processor 1122, and/or the handover system 1114 configured to perform the functions recited by the aforementioned means. In another aspect, the aforementioned means may be a module or any apparatus configured to perform the functions recited by the aforementioned means.

In one configuration, the apparatus configured for wireless communication also includes means for determining. In one aspect, the determining means may be the receive processor 370, the controller/processor 390, the memory 392, the handover module 391, the determining module 1106, the processor 1122, and/or the handover system 1114 configured to perform the functions recited by the aforementioned means. In another aspect, the aforementioned means may be a module or any apparatus configured to perform the functions recited by the aforementioned means.

Several aspects of a telecommunications system has been presented with reference to TD-SCDMA and LTE systems. As those skilled in the art will readily appreciate, various aspects described throughout this disclosure may be extended to other telecommunication systems, network architectures and communication standards. By way of example, various aspects may be extended to other UMTS systems such as W-CDMA, high speed downlink packet access (HSDPA), high speed uplink packet access (HSUPA), high speed packet access plus (HSPA+) and TD-CDMA. Various aspects may also be extended to systems employing global system for mobile communications (GSM), long term evolution (LTE) (in FDD, TDD, or both modes), LTE-Advanced (LTE-A) (in FDD, TDD, or both modes), CDMA2000, evolution-data optimized (EV-DO), ultra mobile broadband (UMB), IEEE 802.11 (Wi-Fi), IEEE 802.16 (WiMAX), IEEE 802.20, ultra-wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   receiving an inter-radio access technology (IRAT) handover command to handover a user equipment from a source cell to a target cell, the handover command not having a random access configuration;
   modifying a current uplink timing advance of the source cell based at least in part on: a difference between an uplink timing of the source cell and a downlink timing of the source cell, and a difference between an uplink timing of the target cell and a downlink timing of the target cell; and
   determining an uplink timing advance of the target cell based at least in part on the modified current uplink timing advance of the source cell.

2. The method of claim 1, further comprising modifying the current uplink timing advance of the source cell based at least in part on a difference between a measured downlink timing of the source cell and a downlink timing of the target cell.

3. The method of claim 1, in which the source cell comprises a long term evolution (LTE) cell, and in which the target cell comprises a time division synchronous code division multiple access (TD-SCDMA) cell.

4. A method of wireless communication, comprising:
   receiving an inter-radio access technology (IRAT) handover command to handover a user equipment from a source cell to a target cell, the handover command not having a random access configuration;
   modifying a current uplink timing advance of the source cell based at least in part on a difference between a frame boundary of the source cell and a frame boundary of the target cell, in which the frame boundary difference of the source cell is based at least in part on a source cell system frame number (SFN) and a source cell subframe number and the frame boundary difference of the target cell is based at least in part on a target cell system frame number and a target cell subframe number; and determining an uplink timing advance of the target cell based at least in part on the modified current uplink timing advance of the source cell.

5. The method of claim 4, further comprising modifying the current uplink timing advance of the source cell based at least in part on a difference between a measured downlink timing of the source cell and a downlink timing of the target cell.

6. The method of claim 4, in which the source cell comprises a long term evolution (LTE) cell and in which the target cell comprises a time division synchronous code division multiple access (TD-SCDMA) cell.

7. An apparatus for wireless communication, comprising:
a memory; and
at least one processor coupled to the memory and configured:
to receive an inter-radio access technology (IRAT) handover command to handover a user equipment from a source cell to a target cell, the handover command not having a random access configuration;
to modify a current uplink timing advance of the source cell based at least in part on: a difference between an uplink timing of the source cell and a downlink timing of the source cell, and a difference between an uplink timing of the target cell and a downlink timing of the target cell; and
to determine an uplink timing advance of the target cell based at least in part on the modified current uplink timing advance of the source cell.

8. The apparatus of claim 7, in which the at least one processor is further configured to modify the current uplink timing advance of the source cell based at least in part on a difference between a measured downlink timing of the source cell and a downlink timing of the target cell.

9. The apparatus of claim 7, in which the source cell comprises a long term evolution (LTE) cell, and in which the target cell comprises a time division synchronous code division multiple access (TD-SCDMA) cell.

10. An apparatus for wireless communication, comprising:
a memory; and
at least one processor coupled to the memory and configured:
to receive an inter-radio access technology (IRAT) handover command to handover a user equipment from a source cell to a target cell, the handover command not having a random access configuration;
to modify a current uplink timing advance of the source cell based at least in part on a difference between a frame boundary of the source cell and a frame boundary of the target cell, in which the frame boundary difference of the source cell is based at least in part on a source cell system frame number (SFN) and a source cell subframe number and the frame boundary difference of the target cell is based at least in part on a target cell system frame number and a target cell subframe number; and
to determine an uplink timing advance of the target cell based at least in part on the modified current uplink timing advance of the source cell.

11. The apparatus of claim 10, in which the at least one processor is further configured to modify the current uplink timing advance of the source cell based at least in part on a difference between a measured downlink timing of the source cell and a downlink timing of the target cell.

12. The apparatus of claim 10, in which the source cell comprises a long term evolution (LTE) cell and in which the target cell comprises a time division synchronous code division multiple access (TD-SCDMA) cell.

* * * * *